Oct. 23, 1956  W. C. MOOG, JR  2,767,689
ELECTROHYDRAULIC SERVO VALVE
Filed May 22, 1953.  2 Sheets-Sheet 1

INVENTOR.
William C. Moog, Jr.
BY
Beau, Brooks, Buckley & Beau,
ATTORNEYS

Oct. 23, 1956

W. C. MOOG, JR 2,767,689

ELECTROHYDRAULIC SERVO VALVE

Filed May 22, 1953

INVENTOR.
William C. Moog Jr.
BY
Beau, Brooks, Buckley & Beau,
ATTORNEYS

United States Patent Office 2,767,689
Patented Oct. 23, 1956

2,767,689

ELECTROHYDRAULIC SERVO VALVE

William C. Moog, Jr., East Aurora, N. Y., assignor, by mesne assignments, to Cornell Aeronautical Laboratory, Inc., Buffalo, N. Y., a corporation of New York Application May 22, 1953, Serial No. 356,631

3 Claims. (Cl. 121—46.5)

This invention relates generally to the servo-mechanism art, and more particularly to a new and useful electrohydraulic servo valve representing a significant advance in this art over known servo valves such as that disclosed in my United States Patent 2,625,136.

This invention is primarily concerned with the provision of a servo control valve wherein an electric signal is converted to a proportional hydraulic response, such valves being usable, for example, in the control of aircraft and guided missiles and virtually wherever a light-weight and compact servo control valve would prove advantageous.

While there has been considerable research and development work done in this art, and while prior art servo mechanisms of the aforesaid type have been developed which are of considerable utility, such prior art devices as that disclosed, for example, in my aforesaid patent possess various deficiencies under many operating conditions commonly encountered. For example, the valve disclosed in my patent is subject to being affected by changes in the hydraulic system pressure, which changes adversely affect its gain, centering adjustment and general accuracy. Therefore, it is necessary to provide a pressure regulator in the hydraulic system.

Accordingly, it is a primary object of this invention to provide an electro-hydraulic servo valve of the aforesaid type which is essentially completely unaffected by changes in the hydraulic system pressure.

A further object of this invention is to provide a servo valve of the aforesaid type which provides a relatively large hydraulic amplification in response to a relatively small electrical control signal.

In addition, it is an object of this invention to provide an electro-hydraulic servo valve having essentially constant gain over a wide operating range.

Still another object of this invention is to provide a servo valve as aforesaid having improved linearity and symmetry.

It is also an object of this invention to provide an electro-hydraulic servo valve operable at relatively low temperatures.

A further object of this invention is to provide a servo valve as aforesaid which is relatively simple and compact in construction, which is readily adjusted, and which is extremely practical and dependable in operation.

An electro-hydraulic servo valve according to my invention is broadly characterized by the provision of a balanced movable valve member actuated by separate hydraulic amplifiers, the valve member being driven by changes in the pressure differential between the hydraulic amplifiers induced by a signal-responsive electric motor, whereby the valve member is proportionately controlled in response to the magnitude of an electrical control signal.

The foregoing and other objects and advantages will become clearly apparent upon a perusal of the ensuing detailed description, taken together with the accompanying drawings forming a part thereof wherein like reference numerals are used to denote like parts throughout the various views and wherein.

Figures 1, 2:
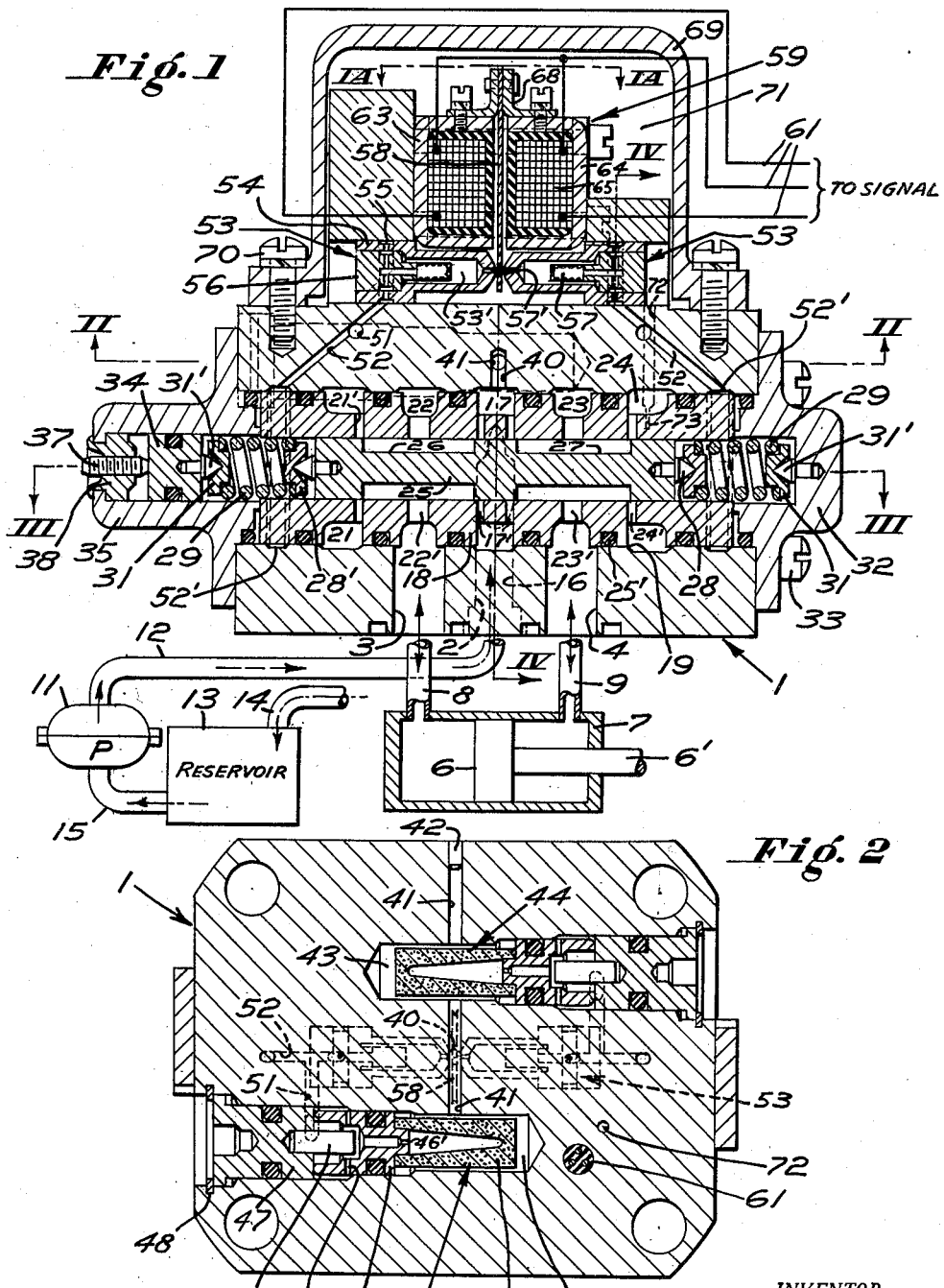
Fig. 1 is a longitudinal sectional view through a preferred embodiment of a servo valve according to my invention.
Fig. 2 is a view in section taken about on lines II—II of Fig. 1.

Referring now to the accompanying drawings which illustrate a preferred embodiment, there is shown a valve body, generally designated 1, preferably formed of aluminum and provided on its bottom face with a pressure fluid supply port 2, pressure fluid control ports 3 and 4, and a fluid drain port 5. Ports 3 and 4 serve to connect the valve with a mechanism to be operated thereby, which mechanism is schematically illustrated herein as comprising a double acting piston 6 arranged within a cylinder 7. Conduits 8 and 9 are adapted to place ports 3 and 4, respectively, in communication with opposite sides of piston 6 for operation thereof in a manner to be described. Pressure port 2 is adapted for communication with a pressure fluid pump 11 through a conduit 12, said pump being connected to a pressure fluid reservoir 13 having an inlet conduit 14 by means of a delivery conduit 15. Pump 11 is arranged to deliver fluid under the desired pressure to port 2, and such fluid passes from port 2 through a passage 16 to an annular passage 17 defined by an annular groove around a substantially cylindrical bushing 18 and an annular recess in the wall of a substantially cylindrical bore 19.

Bushing 18 comprises a tubular member preferably formed of steel and having an outer diameter slightly less than the inside diameter of bore 19, and said bushing is provided with a series of annular grooves therearound, which grooves cooperate with annular recesses in the wall of bore 19 to define a series of annular passages 21, 22, 23 and 24. Passages 22 and 23 communicate with control ports 3 and 4, respectively, and passages 21 and 24 communicate with drain port 5 as will become clearly apparent. Intermediate each of the aforesaid annular passages and adjacent opposite ends of bushing 18 said bushing is annularly grooved to receive O rings 25' adapted to bear against the wall of bore 19 for fluid sealing purposes. Bushing 18 is also formed to provide a series of radial passages 21', 22', 23' and 24' placing annular passages 21, 22, 23, and 24, respectively, in communication with the bore of said bushing. Bushing 18 is further provided with spaced radial passages 17' placing passage 17 in communication with the bore of said bushing.

A valve spool 25 is slidably mounted within bushing 18 for axial movement therein, and spool 25 is provided with spaced annular grooves 26 and 27 arranged on opposite sides of the midpoint thereof for selectively placing passage 17 in communication with passage 22 or 23 to control fluid flow through control ports 3 and 4 as will be more fully described hereinafter.

Valve spool 25 is provided at its opposite ends with pivot pins 28 bearing in members 28' carried by coiled compression springs 29 at one end thereof, and at their other ends springs 29 carrying members 31 bearing against pivot pins 31'. One of said pivot pins 31' is mounted in a cap 32 fixed to one side of body 1 as by means of screws 33 while the other pivot pin 31' is mounted in a member 34 slidable within a second cap 35 secured to the opposite side of body 1 as by means of screws 36, said member having an O ring seal with cap 35 and bearing against an adjustment screw 37 carried in an end block 38 secured within end cap 35 in any conventional manner. Springs 29 are selected so as to balance each other and provide a uniform loading on the opposite ends of spool 25, and it will be appreciated that by adjustment of screw 37 valve spool 25 can be accurately centered within bushing 18 and the spring load thereon can be selectively varied.

As previously set forth, spool 25 is driven by a signal induced change in differential pressure between separate hydraulic amplifier pressures exerted on opposite ends thereof, and this is accomplished in the following manner.

A portion of the pressure fluid in passage 17 is diverted through a short vertical passage 40 extending from passage 17 to a transverse passage 41 formed, for example, by drilling in from one side of body 1 and then inserting a plug 42 in the outer end of such drilled passage. Passage 41 extends in opposite directions from passage 40 and each branch thereof extends to a cavity 43 containing a filter assembly 44. Said filter assemblies 44 each comprise a hollow porous metal filter 45 through which the pressure fluid passes and which is designed to remove any particles entrained therein above a predetermined size, the pressure fluid passing into the hollow interior thereof and thence through a restricted orifice 46' in a first plug member 46 fitted within cavity 43 and having an O ring sealing gasket therearound. Filter 45 is fixed to the inner end of member 46, as by soldering, and the opposite end of member 46 is secured to an end plug 47, as by threaded engagement therewith. Plug 47 is provided with an O ring gasket therearound and is locked within cavity 43 as by a locking ring 48. Plug 47 carries a magnet 49 extending into member 46, and the pressure fluid passes by magnet 49, which removes metallic particles entrained in the fluid, and thence outwardly through a radial passage 50 in member 46 to cavity 43 and from there through a passage 51 in body 1 which intersects a diagonally extending passage 52. As clearly illustrated in Fig. 1, passages 52 extend between two nozzle assemblies generally designated 53 and passages 52' extending around and through the opposite ends of bushing 18 and communicating with the opopsite ends of valve spool 25.

Nozzle assemblies 53 are arranged in fixed opposed relation in a bore through the upper portion of body 1, and each of said nozzle assemblies 53 comprises a hollow outer member 54 having an annular fluid passage 55 therearound communicating with the associated passage 52 and radially extending passages interconnecting passage 55 and the interior of member 54. A plug 56, formed with radial passages communicating with passage 55 and with a longitudinal passage extending into a hollow filter 57 of wire cloth or the like carried by said plug, is fitted in member 54 and defines therein a pressure chamber 53'. Pressure fluid passes through filter 57 into chamber 53' and then through a restricted discharge orifice or outlet 57' in the outer end of member 54, and the flow of fluid from the outlets 57' is restricted by a pressure reaction member 58. Nozzle assemblies 53 are identical, and are disposed with their discharge outlets directed in opposition on opposite sides of member 58.

Pressure reaction member 58 comprises an armature plate mounted in an electric motor 59 provided with terminals 61 which it will be observed from Fig. 2, pass through body 1 to a connector plug 62, and said motor is provided with pole pieces 63 and 64, a coil 65 connected to said terminals, and permanent magnets 66 and 67 arranged to contribute toward the maintenance of dissimilar poles of pole pieces 63 and 64. Plate 58 is mounted on a base 68 providing for cantilever mounting of the plate 58, and it will be observed that plate 58 extends through the air gap between pole pieces 63 and 64 into the space between nozzles 53. Thus, motor 59 has a permanent magnetic field and a variable magnetic field superimposed thereon in response to an electric signal for varying the force of plate 58 and its position with respect to nozzle outlets 57'.

It will be seen that the reaction member 58 is arranged in spaced relation to the outlets 57' of the nozzles 53 so as to be impinged by the fluid issuing therefrom. Since the mounting of the reaction member permits limited arcuate movement thereof relative to the nozzle outlets, i. e. closer to one nozzle and farther away from the other nozzle, variable annular orifices are provided for discharging fluid. Variations in the position of the reaction member relative to the nozzles produce proportional and differential changes in the areas of said annular orifices resulting in differential changes in pressure drops across such orifices.

Plate 58 is constructed of low hysteresis, magnetic resilient material and hence is a magnetically permeable reaction plate, and has a relatively low spring rate at the air gap between the pole pieces by virtue of its cantilever mounting, being free to move in said air gap, and it is a particular feature of this invention that the cantilever spring rate of plate 58 is balanced against the magnetomotive force of motor 59 when there is no external signal imposed thereon. Also, because the pressure is essentially identical in each nozzle chamber at zero signal, the two nozzles are balanced on opposite sides of plate 58 and center said plate. In this way, the gain of the instant servo valve mechanism will remain essentially constant and unaffected by pressure fluctuations in the hydraulic system, thereby providing accuracy and uniformity without requiring pressure regulators and the like.

Nozzles 53 and motor 59 are contained within a cap 69 secured to the top of body 1 as by screws 70 in fluid tight relation therewith and defines therewith a sump chamber 71 filled with pressure fluid. A pressure fluid drain passage 72 having a restriction 73 therein extends from chamber 71 through body 1 to a drain cavity 74 which in turn communicates with drain port 5 previously described. In addition, a passage 75 extends from each of passages 21 and 24 to drain cavity 74.

Figure 3:
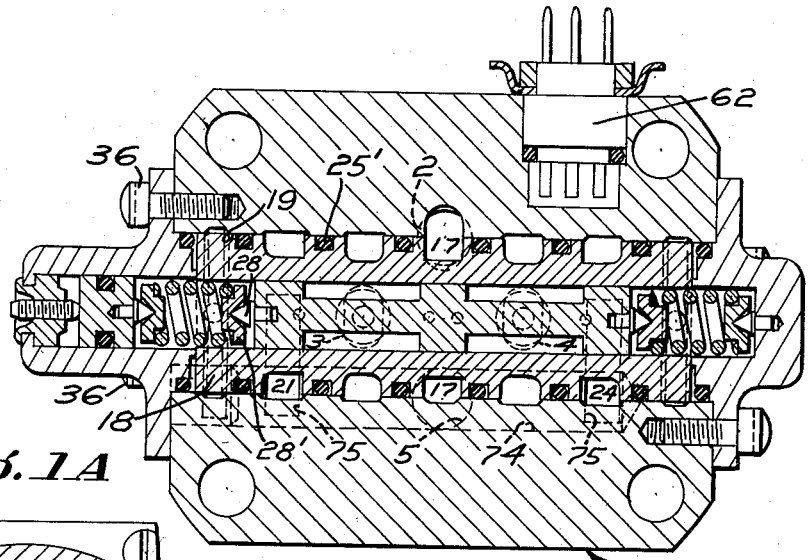
Fig. 3 is a view in section taken about on line III—III of Fig. 1.
Figure 1A:
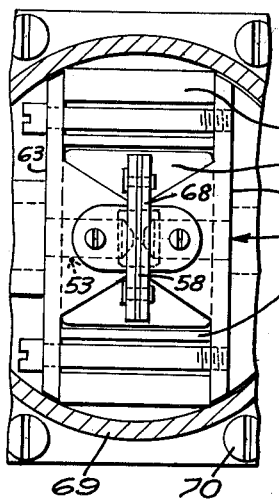
Fig. 1A is a fragmentary detail view taken about on line IA—IA of Fig. 1.
Figure 4:
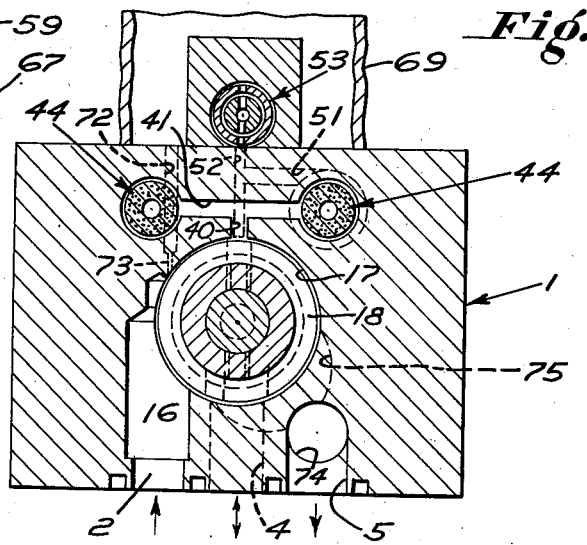
Fig. 4 is a view in section taken about on line IV—IV of Fig. 1.

The operation of this invention is as follows. Assuming that no external electric signal is being applied to motor 59 and that valve spool 25 is centered, pressure fluid passes through port 2 and passage 16 to passage 17, but does not pass through either of passages 17' to grooves 26 or 27 on opposite sides of spool 25 inasmuch as said spool is centered and closes off both passages 17', as illustrated in Figs. 1 and 3. Fluid does pass from passage 17 through passages 40 and 41 to the two filter assemblies 44, and then through said filter assemblies to passages 51 and 52, from which passages said pressure fluid passes into both chambers 53' of nozzle assemblies 53 and through passages 52' adjacent the opposite ends of bushing 18 to the opposite ends of valve spool 25. The pressure fluid passes through outlets 57' toward opposite sides of pressure reaction member 58, and inasmuch as the spring rate of member 58 is balanced against the residual magnetomotive force of motor 59 and inasmuch as the pressure fluid is applied against opposite ends of spool 25, the system is balanced and spool 25 and member 58 remain centered. In other words, when no electrical signal is impressed on the electromagnetic means the pressures present in the nozzles, also transmitted to the respective spool ends, and acting on the armature plate 58 operate to position this plate so as to equalize the pressures.

However, should the signal producing apparatus, not illustrated, indicate the need for a corrective movement of piston 6, an electric signal will pass through leads 61 to motor 59 causing a proportionate deflection of armature member 58 toward one or the other of nozzle assemblies 53 depending upon the sense of the signal. Member 58 restricts fluid flow from nozzle outlets 57', and upon movement toward one of nozzle assemblies 53, for example the left nozzle in Fig. 1, the flow of pressure fluid from its associated outlet 57' is further restricted thus increasing the pressure in its chamber 53', which increase in pressure is transmitted through passages 52 and 52' to the left end of spool 25. Simultaneously, fluid flow from the other outlet 57' is less restricted whereby the pressure in its associated chamber 53' at the right end of the spool 25 decreases. The change in differential pressure between the two hydraulic amplifiers, which is proportional to the electric signal, is exerted on opposite ends of spool 25 causing movement of said spool to the right in Fig. 1 whereby pressure fluid will then pass from passage 17 through the left passage 17' into slot 26 and thence through passage 22' and 22 and port 3 to the left side of piston 6. Simultaneously, pressure fluid is enabled to drain from the right side of piston 6 through passage 9, port 4, passages 23 and 23', slot 27, passages 24' and 24 and drain passage 75. In this way, piston 6 is moved in proportion to the electric control signal.

Once the electric signal on motor 59 is reduced to 0, the parts will restore themselves to center position inasmuch as the pressure in chambers 53' and consequently at opposite ends of spool 25 will then be in balanced relation.

Should the electric motor control signal be in the opposite direction, the same action will occur but with an increase in pressure on the right end of spool 25 and a corresponding decrease in pressure at the left end thereof, whereby the pressure differential thereacross is reversed to cause movement of spool 25 to the left in Fig. 1.

Thus when an electrical signal is impressed on the electromagnetic means, a torque is applied to the armature plate which causes a change in the position thereof relative to the nozzles to produce a pressure differential therein and in the spool end chambers. This differential pressure produces a torque on the armature plate to counterbalance the electromagnetically induced torque thereon and further produces a consequent shift of the valve spool proportional to the strength of the electrical signal, since the torque applied to the armature plate by the magnetomotive effect of the permanent magnet means substantially counterbalances the torque applied to this plate by its mounting means in all operative positions of this plate.

It is a particular advantage of a servo valve according to this invention that the same is essentially free from adverse effects by reason of pressure fluctuations in the pressure fluid supply system. Since the pressure fluid at the same system pressure is supplied to both pressure chambers 53' and the discharge outlets 57' of said chambers are balanced against opposite sides of the pressure reaction member 58, and since movement of spool 25 is determined only by the pressure differential between said chambers 53', pressure fluctuations in the pressure fluid supply system do not produce a change in the pressure differential between said chambers and therefore do not affect the position of valve spool 25. Furthermore, it is another advantage of a servo valve according to this invention that the overall gain thereof, which may be expressed in terms of the stroke of spool 25 in response to a predetermined motor signal, remains essentially constant despite pressure fluctuations in the pressure fluid supply system. As previously pointed out, such pressure changes do not affect the centering balance of valve spool 25 or of reaction member 58, and since the spring rate of member 58 is balanced against the residual magnetism or the magnetomotive force of motor 59 at zero input signal, the electric signal in every case produces a proportionate change in differential pressure between the hydraulic amplifiers and essentially no variations are produced by reason of variations in the degree of movement of member 58 necessary to produce such change in differential pressure.

Certain other features of the instant valve are worthy of more specific mention. For example, the various filters 44 and 57 insure proper operation of the valve and it will be appreciated that inasmuch as armature plate 58 is spaced extremely closely to nozzle outlets 57', as for example, one/one thousandth of an inch, it is highly essential that impurities anywhere near that size entrained in the pressure fluid be removed therefrom before reaching the nozzle outlets. In addition, inasmuch as bushing 18 is mounted in O rings in body 1, there is no binding thereof by the valve body such as to impair proper operation of the valve spool at low temperatures. Accordingly, it will be found that the instant servo valve operates extremely satisfactorily at relatively low temperatures such as in the neighborhood of minus 65° F.

In addition, it will be appreciated that chamber 71 functions as a sump, and sump chambers are subject to surges which would tend to impair the operation of the valve. However, by providing the restriction 73 in drain 72 such surges are substantially avoided, and the restriction is such as to build up a pressure within chamber 71 equal to approximately 5% of the system pressure.

Therefore, it will be appreciated that the instant invention fully accomplishes the aforesaid objects. While only a preferred embodiment is disclosed and illustrated in detail, it will be appreciated that the instant invention is not necessarily limited to such details but comprehends all such modifications and refinements thereof as fall within the scope of the appended claims.

Having fully disclosed and completely described my invention in what is presently considered to be a preferred embodiment thereof, together with its mode of operation, what I claim as new is:

1. In an electro-hydraulic servo valve including a valve body having a bore and fluid supply, drain and control ports communicating with said bore at axially spaced locations, a valve spool slidably arranged in said bore for controlling fluid flow through said ports, a chamber at each end of said valve spool, restricted passage means for conducting fluid from said supply port to said chambers and spring means in said chambers for positioning said valve spool in a predetermined relation to said ports when the fluid pressures in said chambers are equal; the combination therewith of means for differentially varying the pressure in said chambers in response and proportion to an electrical signal and comprising, motor means including spaced pole pieces and permanent magnet and electromagnetic means associated with said pole pieces, a magnetically permeable reaction member serving as an armature for said motor means and fixedly supported at one end and having its opposite end free and extending between said pole pieces and arranged for limited arcuate movement therebetween and having a spring rate which is substantially counterbalanced by the magnetic attractive effect of said permanent magnet means in all operative positions of said member, two nozzles having fluid communication severally with said chambers, and means fixedly mounting said nozzles on opposite sides of said member and in spaced relation thereto to provide jointly therewith variable annular orifices for discharging fluid, variations in the position of said member relative to said nozzles producing proportional and differential changes in the pressure drops across said orifices, whereby when no electrical signal is impressed on said electromagnetic means the pressures present in said nozzles acting on said member operate to position the same so as to equalize the pressures but when an electrical signal is impressed on said electromagnetic means a torque is applied to said member which causes a change in the position thereof relative to said nozzles to produce a pressure differential therein and in said chambers, said differential pressure producing a torque on said member to counterbalance the electromagnetically induced torque and further producing a consequent shift of said valve spool proportional to the strength of the electrical signal.

2. In an electro-hydraulic servo valve including a valve body having a bore and fluid supply, drain and control ports communicating with said bore at axially spaced locations, a valve spool slidably arranged in said bore for controlling fluid flow through said ports, a chamber at each end of said valve spool, restricted passage means for conducting fluid from said supply port to said chambers and spring means in said chambers for positioning said valve spool in a predetermined relation to said ports when the fluid pressures in said chambers are equal; the combination therewith of means for differentially varying the pressures in said chambers in response and proportion to an electrical signal and comprising, motor means including spaced pole pieces and permanent magnet and electromagnetic means associated with said pole pieces, a magnetically permeable reaction member serving as an armature for said motor means and extending between said pole pieces and arranged for limited arcuate movement therebetween and so constructed and mechanically supported that said member moves with increasing mechanical restraint as it approaches either pole piece and such mechanical restraint is substantially counterbalanced by the magnetomotive attractive effect of said permanent magnet means in all operative positions of said member, two nozzles having fluid communication severally with said chambers, and means fixedly mounting said nozzles in spaced relation to different surface portions of said member to provide jointly therewith variable annular orifices for discharging fluid, variations in the position of said member relative to said nozzles producing proportional and differential changes in the pressure drops across said orifices, whereby when no electrical signal is impressed on said electromagnetic means the pressures present in said nozzles acting on said member operate to position the same so as to equalize the pressures but when an electrical signal is impressed on said electromagnetic means a torque is applied to said member which causes a change in the position thereof relative to said nozzles to produce a pressure differential therein and in said chambers, said differential pressure producing a torque on said member to counterbalance the electromagnetically induced torque and further producing a consequent shift of said valve spool proportional to the strength of the electrical signal.

3. In an electro-hydraulic servo valve including a valve body having a bore and fluid supply, drain and control ports communicating with said bore at axially spaced locations, a valve spool slidably arranged in said bore for controlling fluid flow through said ports, a chamber at each end of said valve spool, restricted passage means for conducting fluid from said supply port to said chambers and spring means in said chambers for positioning said valve spool in a predetermined relation to said ports when the fluid pressures in said chambers are equal; the combination therewith of means for differentially varying the pressures in said chambers in response and proportion to an electrical signal and comprising, two fixed nozzles having fluid communication severally with said chambers, a magnetically permeable reaction plate, means mounting said reaction plate in a position opposite and in spaced relation to the outlets of said nozzles so as to be impinged by the fluid issuing therefrom, said nozzles and reaction plate being so arranged relative to one another as to provide variable annular orifices for discharging fluid, variations in the position of said reaction plate relative to said nozzles producing proportional and differential changes in the areas of said orifices resulting in differential changes in the pressure drops across said orifices, and motor means including permanent magnet means and electromagnetic means operatively associated with said reaction plate which serves as an armature therefor and adapted to apply a magnetomotively produced torque on said reaction plate so as to move it closer to one nozzle and farther away from the other nozzle, the torque applied to said reaction plate by the magnetomotive effect of said permanent magnet means substantially counterbalancing the torque applied to said reaction plate by its mounting means in all operative positions of said reaction plate, whereby when no electrical signal is impressed on said electromagnetic means the pressures present in said nozzles acting on said armature plate operate to position the same so as to equalize the pressures but when an electrical signal is impressed on said electromagnetic means a torque is applied to said armature plate which causes a change in the position thereof relative to said nozzles to produce a pressure differential therein and in said chambers, said differential pressure producing a torque on said armature plate to counterbalance the electromagnetically induced torque and further producing a consequent shift of said valve spool proportional to the strength of the electrical signal.

References Cited in the file of this patent

UNITED STATES PATENTS

| | | |
|---|---|---|
| 734,285 | Thomann | July 21, 1903 |
| 2,020,847 | Mitereff | Nov. 12, 1935 |
| 2,257,203 | Thacker | Sept. 30, 1941 |
| 2,328,163 | Moore | Aug. 31, 1943 |
| 2,625,136 | Moog | Jan. 13, 1953 |
| 2,654,347 | Clark | Oct. 6, 1953 |
| 2,655,904 | Strayer et al. | Oct. 20, 1953 |
| 2,655,939 | Tauscher | Oct. 20, 1953 |
| 2,655,940 | Jackson | Oct. 20, 1953 |
| 2,675,652 | Chiappulini | Apr. 20, 1954 |

FOREIGN PATENTS

| | | |
|---|---|---|
| 830,705 | Germany | Feb. 7, 1952 |